(12) United States Patent
Lefsrud (10) Patent No.: US 7,743,805 B2
(45) Date of Patent: Jun. 29, 2010

(54) DEBARKING TIP ASSEMBLY WITH REPLACEABLE CUTTING ELEMENT

(75) Inventor: Jorgen Lefsrud, Victoria (CA)

(73) Assignee: Nicholson Manufacturing Ltd., Sidney (CA)

( * ) Notice: Subject to any disclaimer, the term of this patent is extended or adjusted under 35 U.S.C. 154(b) by 462 days.

(21) Appl. No.: 11/818,518

(22) Filed: Jun. 13, 2007

(65) Prior Publication Data

US 2008/0308186 A1 Dec. 18, 2008

(51) Int. Cl.
*B27L 1/00* (2006.01)
(52) U.S. Cl. .................. 144/208.8; 144/208.1
(58) Field of Classification Search .............. 144/208.1, 144/208.4, 208.5, 208.8; 47/1.01 R, 1.01 S, 47/1.01 T, 1.01 P, 1.01 D
See application file for complete search history.

(56) References Cited

U.S. PATENT DOCUMENTS

| | | | |
|---|---|---|---|
| 3,190,327 A | 6/1965 | Robbins | 144/208 |
| 3,704,733 A | 12/1972 | McColl | 144/2 Z |
| 4,209,047 A * | 6/1980 | Weill | 144/208.8 |
| 4,280,541 A * | 7/1981 | Reimler et al. | 144/208.8 |
| 4,566,371 A | 1/1986 | Jorgensen et al. | 92/92 |
| 4,844,201 A | 7/1989 | Ackerman | 184/6 |
| 5,201,353 A | 4/1993 | Weill | 144/236 |
| 5,472,027 A | 12/1995 | Ackerman | 144/208 E |
| 6,675,846 B1 | 1/2004 | Hoffman | 144/208.6 |
| 6,834,692 B2 | 12/2004 | Lindsay et al. | 144/241 |

* cited by examiner

*Primary Examiner*—Shelley Self
(74) *Attorney, Agent, or Firm*—Seed Intellectual Property Law Group PLLC (57) ABSTRACT

Apparatuses, systems, and methods for debarking logs are shown and described. The disclosed embodiments can be used for quickly and conveniently replacing contact surfaces of swing arm assemblies. Some disclosed embodiments include a swing arm assembly having a debarker tip assembly with a plurality of replaceable cutting elements for engaging logs moving along a processing line. Side-by-side cutting elements can be made of a wear resistant material for a prolonged life. A worn cutting element can be replaced with another cutting element to ensure proper functioning of the debarker apparatus.

10 Claims, 12 Drawing Sheets

DEBARKING TIP ASSEMBLY WITH REPLACEABLE CUTTING ELEMENT

BACKGROUND

1. Technical Field

The present disclosure generally relates to debarker apparatuses, and more specifically to debarker apparatuses having swing arm assemblies with debarking tip assemblies with at least one replaceable cutting element.

2. Description of the Related Art

Rotary log debarkers, commonly referred to as ring debarkers, are used to remove bark from logs to facilitate processing of the logs into lumber and other wood products. Rotary log debarkers often have an array of swing arms pivotally mounted to a rotatable outer ring. Each of the swing arms has a cutting tip for scraping bark from the logs. As a log moves along a processing line of a traditional debarker, the advancing log contacts and pushes against the swing arms. The log then drives the swing arms outwardly until cutting tips of the swing arms engage the periphery of the log. The swing arms are then urged inwardly such that the cutting tips scrape bark off the log in a somewhat spiral pattern.

Conventional cutting tips may include a sharpened edge that cuts or scores the bark and, thus, are subjected to significant forces during the cutting or scoring process. The substantial loads and impacts on the cutting tips and the associated machinery during debarking operations may result in unwanted wearing of the machinery. The cutting tips can be rapidly worn or dulled with some frequency and, consequently, may need to be replaced at frequent regular intervals.

BRIEF SUMMARY

Some embodiments disclosed herein include the realization that swing arm assemblies of a debarker apparatus can have one or more replaceable cutting elements for processing logs (e.g., debarking, scraping, slicing, or otherwise processing logs or other manufacturing materials). The cutting elements may be subjected to cyclic loading that rapidly dulls the cutting elements. In some embodiments, the cutting elements are comprised mostly of a high wear resistant material, such as a hardened material, for a prolonged life. If the cutting elements are not performing properly, the cutting elements can be quickly replaced with limited machine downtime. After the cutting elements have been worn a predetermined amount, the cutting elements can be quickly replaced.

A cutting element can be conveniently replaced with other angled cutting elements to adjust cutting action. In some embodiments, a cutting element can be quickly replaced with another cutting element to increase or decrease the aggressiveness of the swing arm assembly. A kit can have a plurality of cutting elements, wherein each cutting element terminates in a different angled leading edge for debarking.

At least one fastener, in some embodiments, can be provided that prevents (under standard operating conditions) the cutting element from being pulled out of the receiving channel when the at least one fastener is installed in a hole in the swing arm and the clamp assembly is in the closed configuration. In some embodiments, a pair of spaced apart fasteners can be used to keep the clamp assembly in the closed configuration.

The cutting elements can be disposable or nondisposable. As used herein, the term "disposable" when applied to a system or component (or combination of components), such as a cutting element or clamping assembly, is a broad term and refers, without limitation, to a component that is used a finite number of times and then discarded. Some disposable components are used only for one processing cycle and then discarded. Other disposable components are used for more than one processing cycle (e.g., at least three processing cycles) and then discarded.

Various mounting arrangements can be used to couple the cutting elements to the swing arms. In some embodiments, a debarker tip assembly is coupled to the swing arm and can include a clamp assembly and a cutting element detachably coupled to the clamp assembly. The clamp assembly can cooperate with the cutting element to keep stresses in the debarker tip assembly at or below a selected level to limit or prevent damage to the cutting element, or any other component of the debarker tip assembly. Cutting elements with a wide range of tolerances can be used without damaging the clamp assembly or the cutting element itself.

As used herein, the term "debarker tip assembly" is a broad term and generally refers, without limitation, to a distal end of a swing arm assembly having one or more cutting elements or other elements for bark removal. Cutting elements can cut, slice, scrape, or otherwise process the outer surface of the log. For example, a debarker tip assembly can include a pair of removable cutting elements in the form of scraping knifes, blades, sharpened members, inserts, or the like.

In some embodiments, a debarker tip assembly for a debarker apparatus comprises a clamp assembly and a cutting element. The clamp assembly can be moved between an open position for installing the cutting element and a closed position for holding the cutting element. The cutting element can terminate in a tip suitable for processing a log.

In yet other embodiments, a debarker tip assembly for a debarker apparatus comprises a clamp assembly and a cutting element. The clamp assembly is configured to be detachably coupled to a swing arm of the debarker apparatus. The clamp assembly is manipulatable between an open configuration and a closed configuration. The clamp assembly comprises a clamp member and a tip base. The clamp member comprises a mounting region and a retaining region. The mounting region is configured to mate with a complementary portion of the swing arm. The tip base is dimensioned for placement between the clamp member and the swing arm such that a receiving channel is defined between the clamp member and the tip base when the clamp assembly is in the closed configuration. The debarker tip assembly further comprises a cutting element dimensioned so as to fit within the receiving channel of the clamp assembly. The cutting element comprises a leading edge configured to remove bark from a log a narrowed region dimensioned to nest in the receiving channel of the clamp assembly such that the cutting element is fixedly retained by the clamp assembly and the leading edge is exposed to engage the log.

In some embodiments, a cutting element capable of being held in a clamp assembly of a swing arm for a debarker apparatus comprises a leading edge and a narrowed region. The leading edge is sufficiently sharp to debark a log. The leading edge is formed of a hardened material. The narrowed region opposes the leading edge. The narrowed region is dimensioned to fit within a receiving channel of the clamp assembly such that the cutting element is fixedly retained by the clamp assembly. The narrowed region comprises a plurality of contact surfaces positioned and oriented with respect to one another such that stresses in the cutting element are kept at or below a selected level when the leading edge is used to debark a log. In some variations, the stresses can be kept sufficiently low to reduce, limit, or substantially prevent fracturing, plastic deformation, abrasion, combinations, and the like of the cutting element and/or clamp assembly.

In some embodiments, a method of installing a cutting element in a clamp assembly at an end of a debarker swing arm is provided. The debarker swing arm is coupleable to a debarker apparatus. The method comprises positioning a replaceable cutting element configured to remove bark in a channel of the clamp assembly when the clamp assembly is in an open position. The clamp assembly is moved to a closed position to couple the replaceable cutting element to the clamp assembly but allowing the replaceable cutting element to redistribute stresses in the replaceable cutting element in response to different loads being applied to the replaceable cutting element.

In some other embodiments, a method of installing a cutting element in a clamp assembly at an end of a debarker swing arm is provided. The method comprises installing a cutting knife in a swing arm. The cutting knife is configured to remove bark from a log. In some variations, the clamp assembly allows the cutting knife to redistribute stresses in the clamp assembly and/or cutting knife in response to different loads being applied to the cutting knife.

DETAILED DESCRIPTION

The present detailed description is generally directed towards a debarker apparatus with a plurality of swing arm assemblies, each having at least one debarker tip assembly. Some embodiments of the debarker tip assemblies have replaceable cutting elements that define contact features, such as leading edges, for engaging logs. Many specific details of certain exemplary embodiments are set forth in the following description and in FIGS. 1-29 to provide a thorough understanding of such embodiments. One skilled in the art, however, will understand that the disclosed embodiments may be practiced without one or more of the details described in the following description.

Additionally, the debarker tip assemblies are disclosed in the context of swing arms for log debarkers because they have particular utility in this context. However, the debarker tip assemblies can also be used in other contexts to scrape, roughen, slice, grind, or otherwise process logs, lumber, and the like. The debarker tip assemblies may be especially well suited to scrape bark from logs, which are then processed into various forms of lumber.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise. For purposes of this description and for clarity, a debarker apparatus will be described and then a description of its components will follow.

Figure 1:
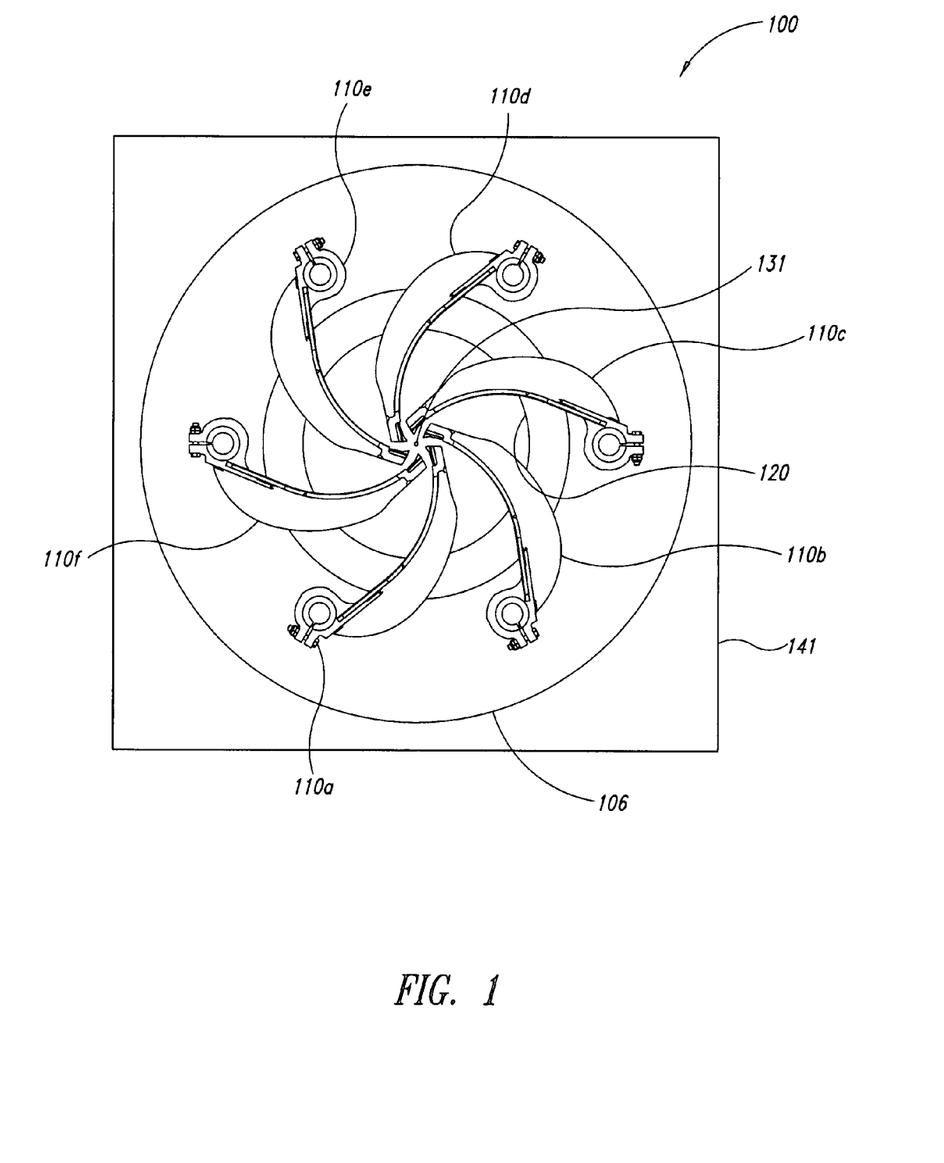
FIG. 1 is a front elevational view of a debarker apparatus having movable swing arm assemblies with debarker tip assemblies, each having a replaceable cutting element.
Figure 2A:
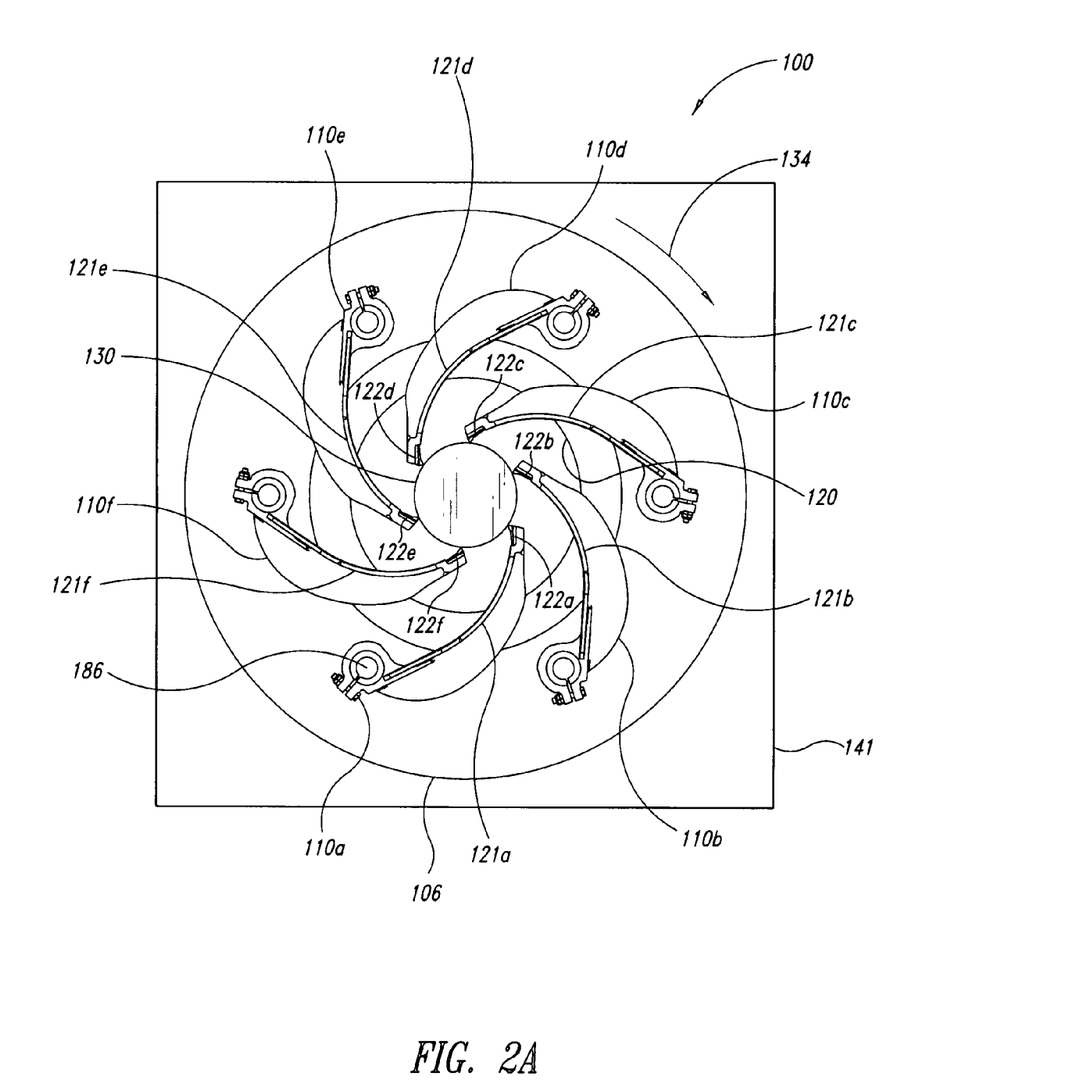
FIG. 2A is a front elevational view of the debarker apparatus of FIG. 1, wherein the swing arm assemblies surround a log.
Figure 2B:
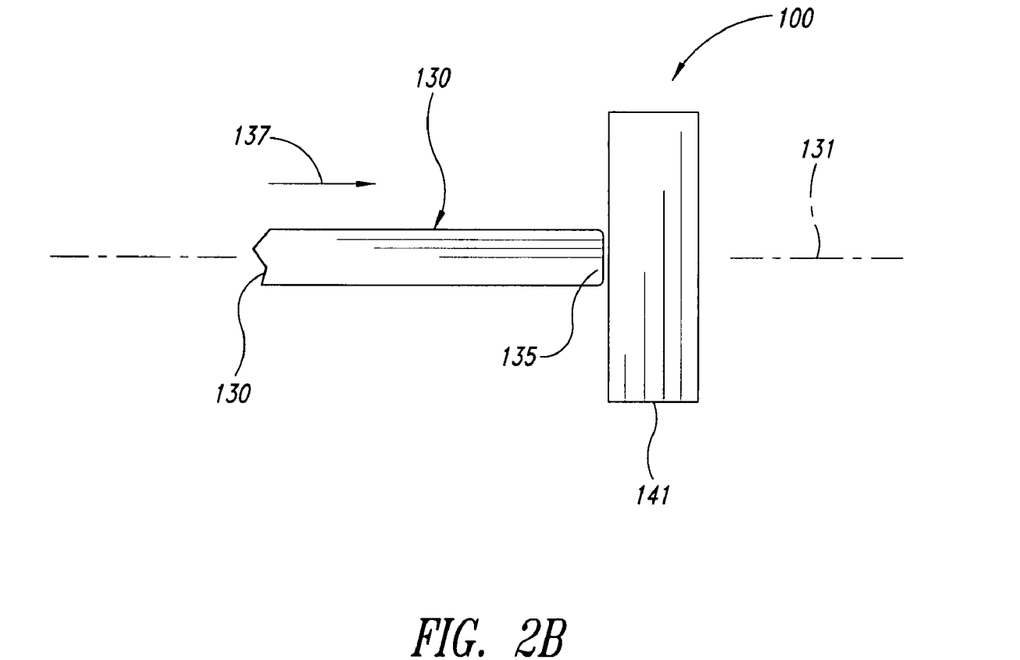
FIG. 2B is a top plan view of the debarker apparatus and log of FIG. 2A, where the log is positioned in the debarker apparatus.

FIGS. 1 to 2B illustrate a debarker apparatus 100 for removing bark from a log. The debarker apparatus 100 includes a rotatable carriage 106 and a plurality of swing arm assemblies 110a-f pivotally coupled to the carriage 106. The swing arm assemblies 110a-f surround a processing line 131 and are movable between an inner position (FIG. 1) and an outer position (FIG. 2A). The rotatable carriage 106 has an opening 120 shaped and dimensioned to receive a log 130 moving down the processing line 131, which extends through the opening 120.

During the debarking process, logs are transported lengthwise along the processing line 131 while the carriage 106 rotates. The illustrated carriage 106 is rotated in the clockwise direction (indicated by the arrow 134 in FIG. 2A) as the log 130 is advanced lengthwise through the opening 120, as indicated by the arrow 137 in FIG. 2B. The end 135 of the log 130 comes into contact with the swing arm assemblies 110a-f, which at least partially block the opening 120. The swing arm assemblies 110a-f can slide spirally outward along the end 135 of the log 130 until the swing arm assemblies 110a-f open and surround and engage the exterior (bark) surface of the log 130, as shown in FIG. 2A.

Once the swing arm assemblies 110a-f are opened, the carriage 106 can rotate the swing arm assemblies 110a-f about the log 130 such that the working ends of the swing arm assemblies 110a-f move along a helical path to process (e.g., scrape, cut, roughen, or the like) the outer surface on the log. The illustrated swing arm assemblies 110a-f have respective debarker tip assemblies 122a-f (FIG. 2A) to scrape a desired amount of bark from the logs.

Because the debarker tip assemblies 122a-f repeatedly engage logs, the debarker tip assemblies 122a-f may be formed, in whole or in part, of a wear resistant material to limit or minimize wear for a prolonged working life. For example, the portions of the debarker tip assemblies 122a-f that strike and cam along the logs can be made of hardened material. Even so, the debarker tip assemblies 122a-f may become dulled, deformed, worn, roughened, or otherwise damaged, especially after extended use. To enhance performance of the debarker apparatus 100, damaged debarker tip assemblies 122a-f can advantageously be replaced with new debarker tip assemblies 122a-f, thereby ensuring proper operation of the debarker apparatus 100. In some embodiments, each of the debarker tip assemblies 122a-f can have at least one replaceable cutting element.

Various types of carriages can be used with the swing arm assemblies 110a-f. The illustrated carriage 106 is rotatably coupled to a debarker drive system 141 (FIG. 2B) and biases the swing arm assemblies 110a-f inwardly against the log 130 with a desired force (e.g., a constant or variable force). One or more biasing systems in the carriage 106 are utilized to bias the swing arm assemblies 110a-f. Thus, the debarker apparatus 100 can controllably increase or decrease the amount of material removed from the logs.

Figure 3:
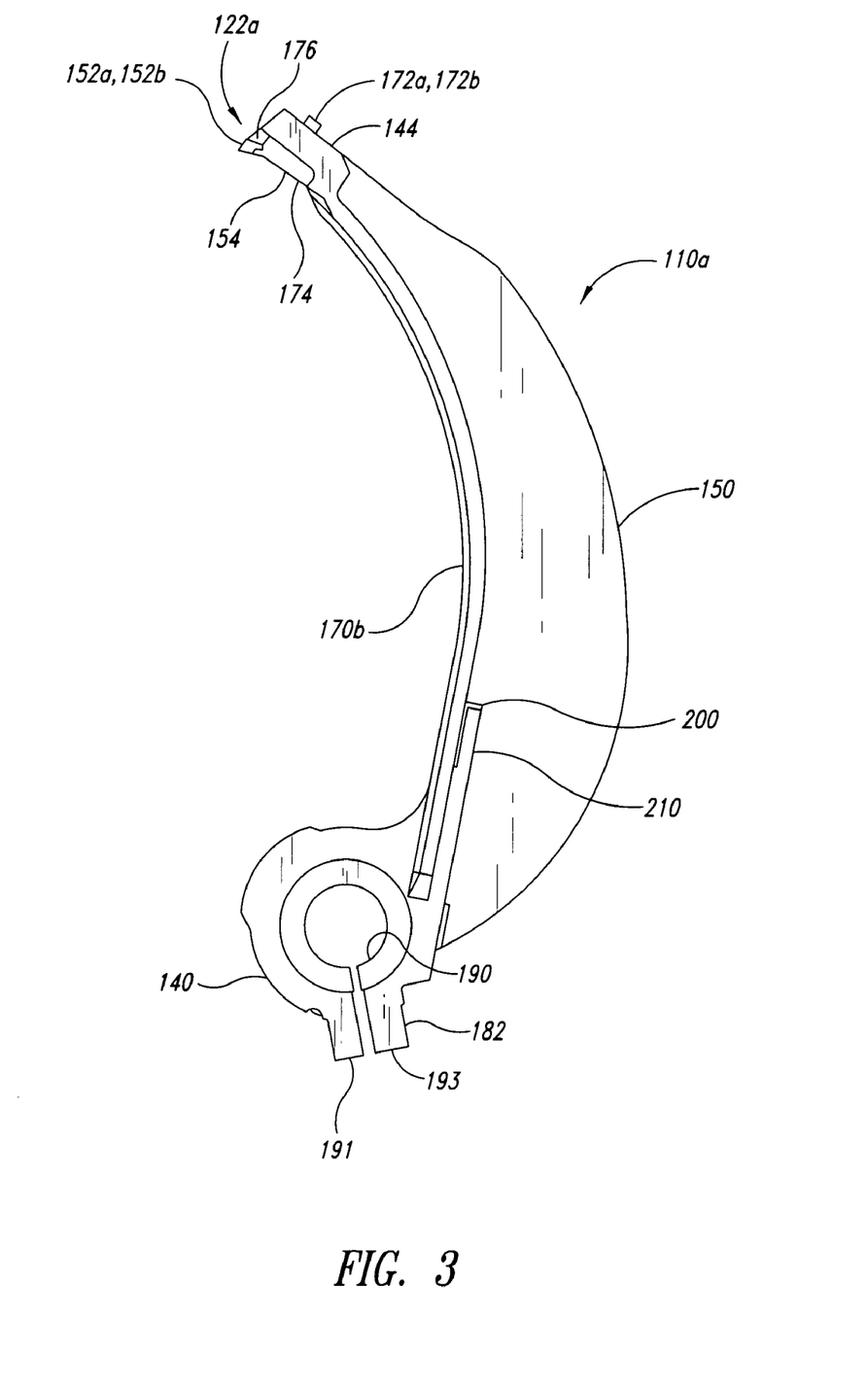
FIG. 3 is a front elevational view of a swing arm assembly with a debarker tip assembly, according to one illustrated embodiment.

FIG. 3 illustrates a swing arm assembly 110a of the debarker apparatus 100 shown in FIGS. 1-2B. It should be noted that the swing arm assemblies 110a-f can be generally similar to each other and, accordingly, the following description of one of the swing arm assemblies applies equally to the others, unless indicated otherwise.

The swing arm assembly 110a has a mounting end 140, a working end 144, and a main body 150 extending between the mounting end 140 and working end 144. The replaceable debarker tip assembly 122a is mounted to the working end 144.

The illustrated mounting end 140 includes a bracket assembly 182 for coupling to a rotating drive member 186 of the carriage 106, as shown in FIG. 2A. An opening 190 of the bracket assembly 182 can be dimensioned to receive the drive member 186. After assembling the bracket assembly 182 and drive member 186, the bracket ends 191,193 of the bracket assembly 182 can be drawn together to tightly clamp onto the drive member 186. In this manner, the swing arm assembly 110a can be fixedly coupled to the drive member 186.

Other types of mounting arrangements can also be used to couple the swing arm assemblies 110a-f to the carriage 106. For example, each of the swing arm assemblies 110a-f can have a mounting end with an outwardly extending drive shaft. Each drive shaft can be received within a complementary chuck of the carriage 106. To articulate the swing arm assemblies 110a-f, the chucks can apply moments to the swing arm assemblies 110a-f as desired.

Figure 4:
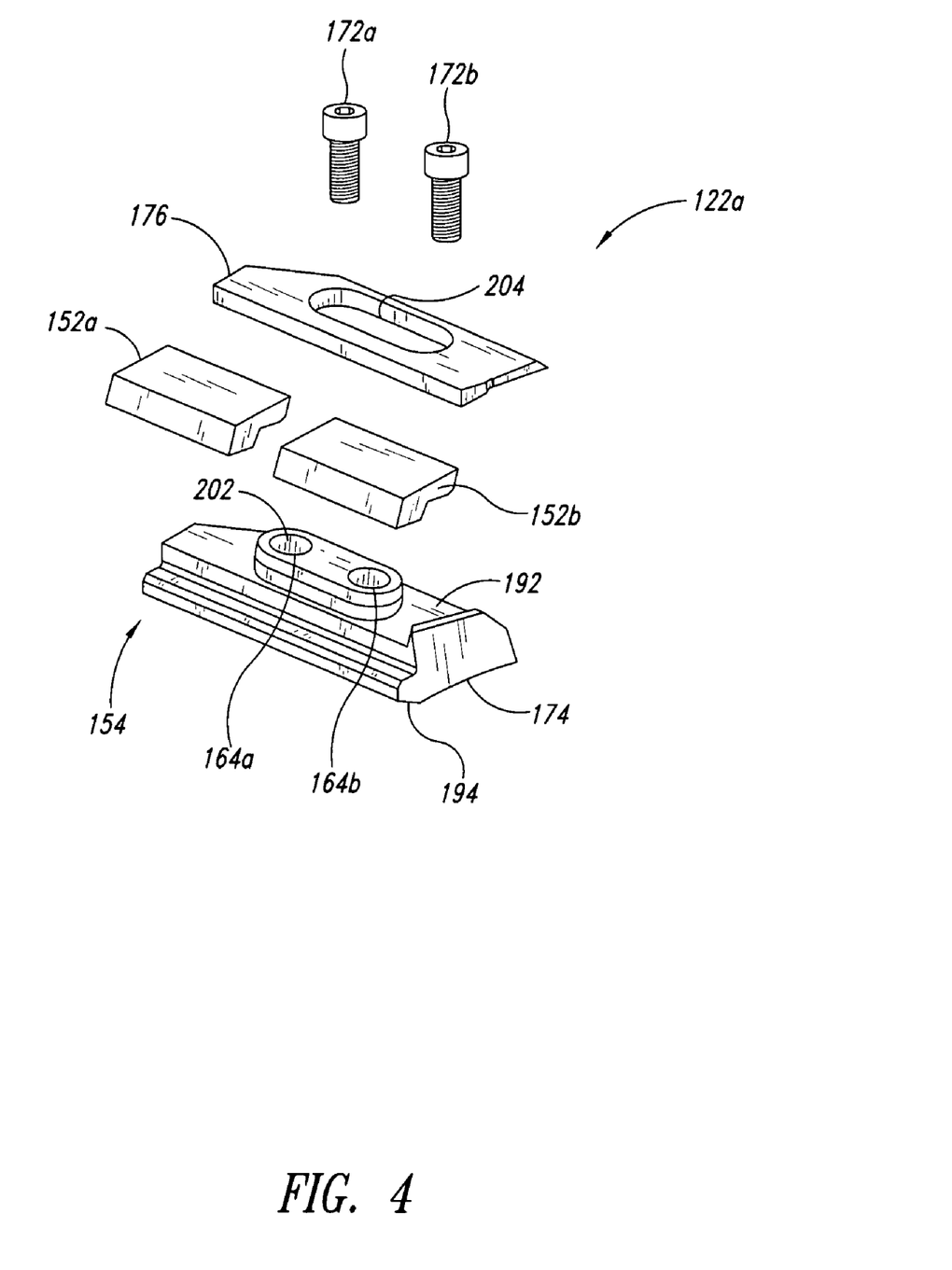
FIG. 4 is an exploded isometric view of a debarker tip assembly, according to one illustrated embodiment.
Figure 5:
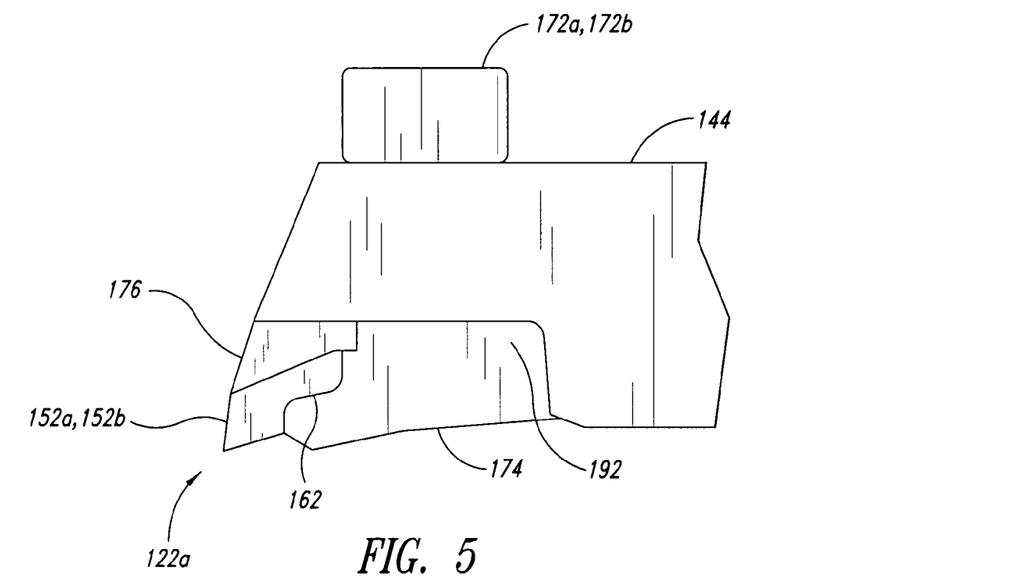
FIG. 5 is a side elevational view of a debarker tip assembly coupled to a swing arm, according to one illustrated embodiment.
Figure 6:
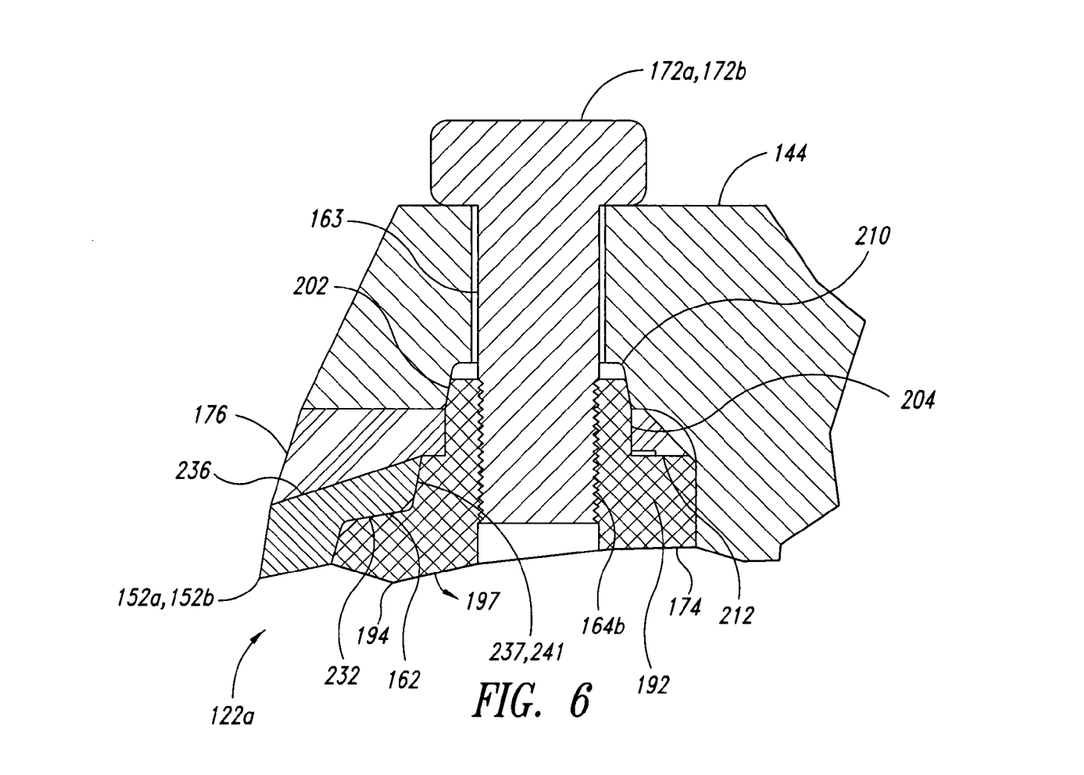
FIG. 6 is a cross-sectional elevational view of the debarker tip assembly and swing arm of FIG. 5.
Figure 7:
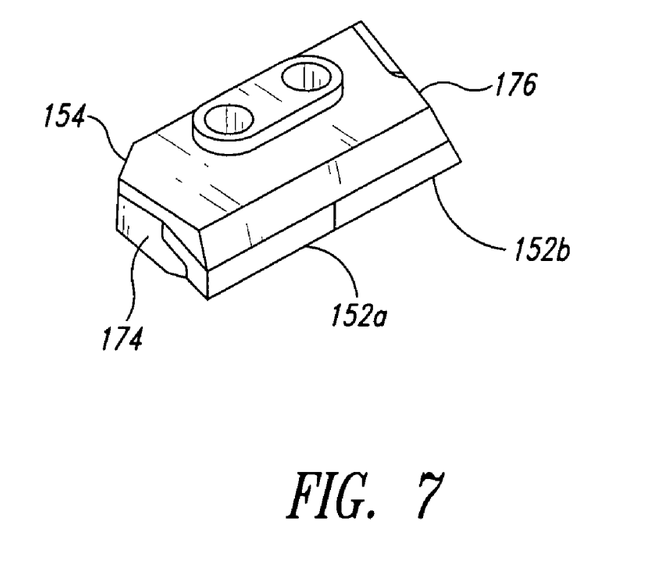
FIG. 7 is an isometric view of a debarker tip assembly, according to one illustrated embodiment.
Figure 8:
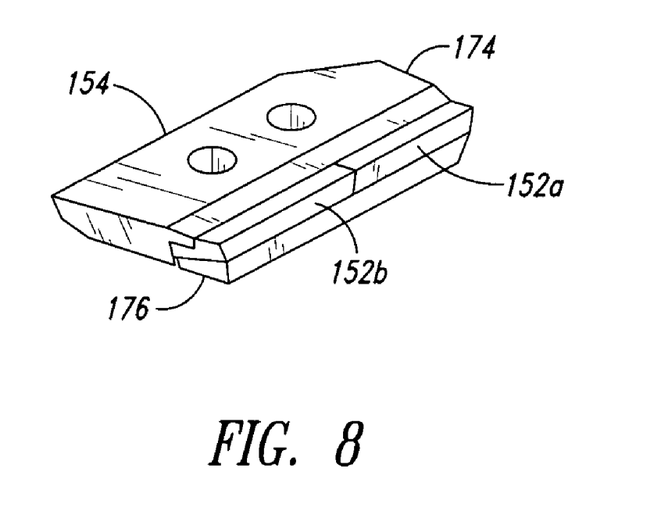
FIG. 8 is another isometric view of the debarker tip assembly of FIG. 7.
Figure 9:
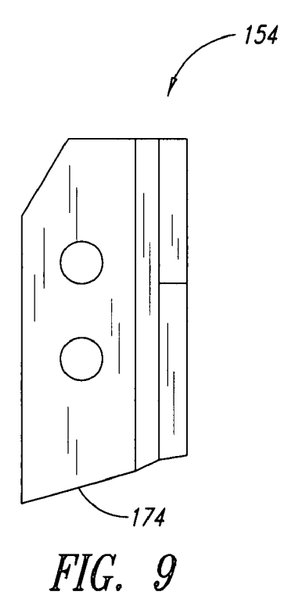
FIG. 9 is a bottom view of the debarker tip assembly of FIG. 7.
Figure 10:
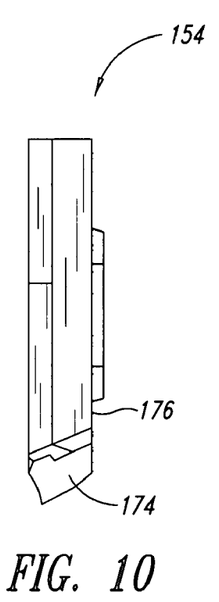
FIG. 10 is a side elevational view of the debarker tip assembly of FIG. 7.
Figure 11:
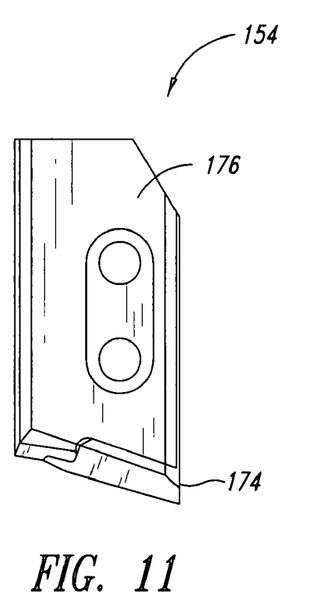
FIG. 11 is a plan view of the debarker tip assembly of FIG. 7.
Figure 12:
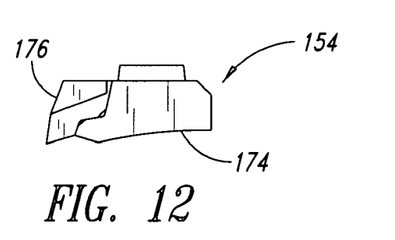
FIG. 12 is a front view of the debarker tip assembly of FIG. 7.
Figure 13:
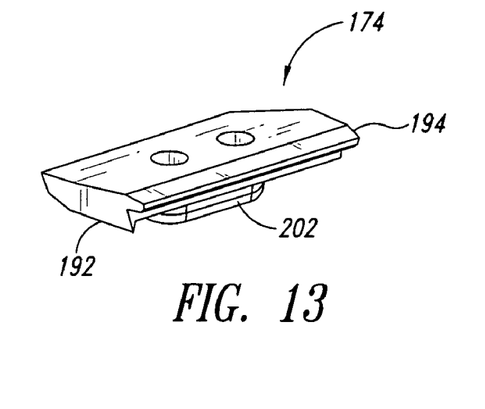
FIG. 13 is an isometric view of a clamp of a debarker tip assembly, in accordance with one illustrated embodiment.
Figure 14:
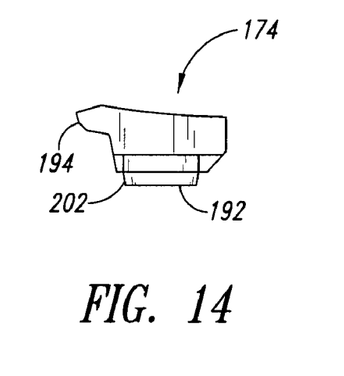
FIG. 14 is a front view of the clamp of FIG. 13.
Figure 15:
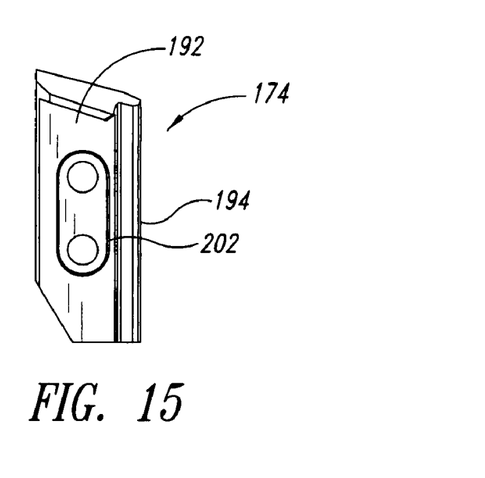
FIG. 15 is a bottom view of the clamp of FIG. 13.
Figure 16:
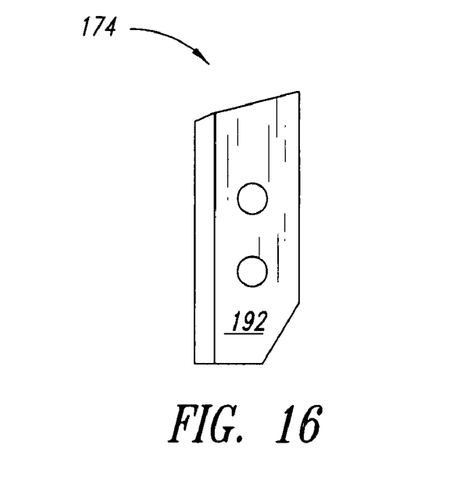
FIG. 16 is a plan view of the clamp of FIG. 13.
Figure 17:
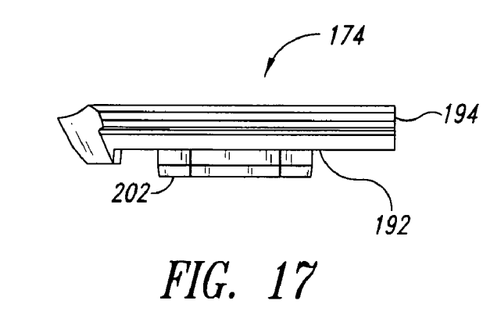
FIG. 17 is a side elevational view of the clamp of FIG. 13.
Figure 18:
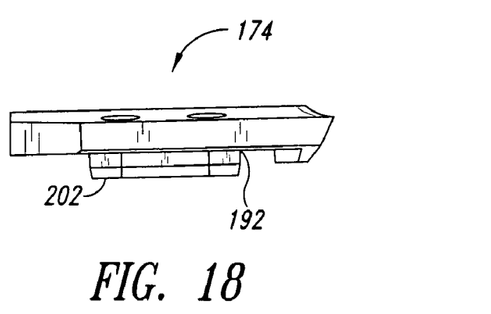
FIG. 18 is another side elevational view of the clamp of FIG. 13.
Figure 19:
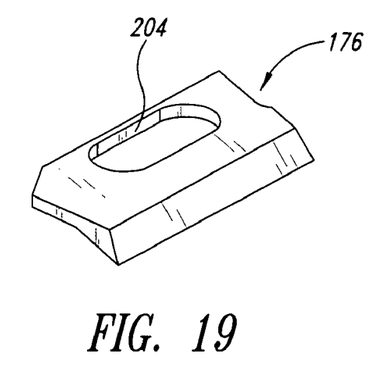
FIG. 19 is an isometric view of a tip base of a debarker tip assembly, in accordance with one illustrated embodiment.
Figure 20:
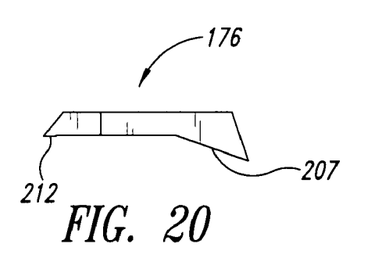
FIGS. 20 and 21A are a front and back view, respectively, of the tip base of FIG. 19.
Figure 21A:
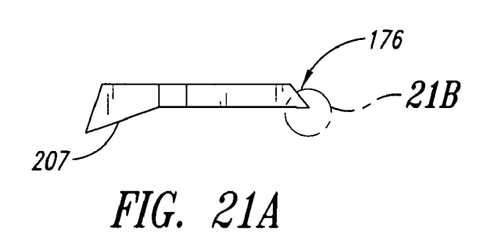
Figure 21B:
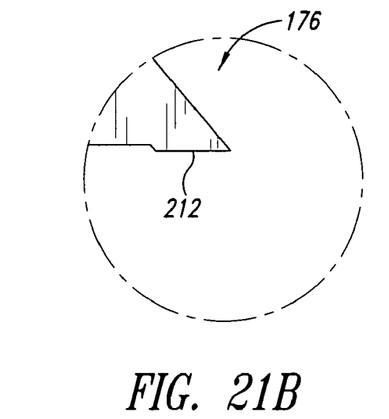
FIG. 21B is a detailed view of a portion of the tip base of FIG. 21A.
Figure 22:
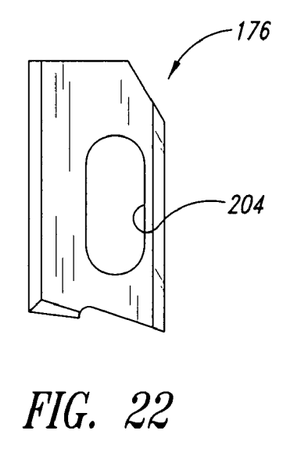
FIG. 22 is a plan view of the tip base of FIG. 19.
Figure 23:
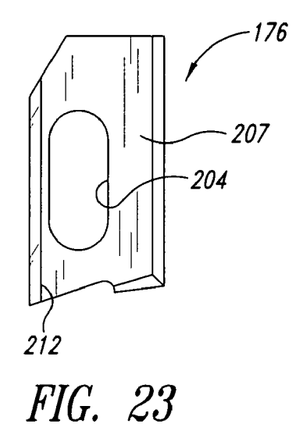
FIG. 23 is a bottom view of the tip base of FIG. 19.
Figure 24:
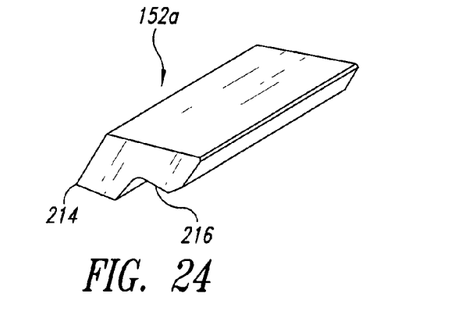
FIG. 24 is an isometric view of a cutting element of a debarker tip assembly, according to one illustrated embodiment.

With continued reference to FIG. 3, the debarker tip assembly 122a includes a clamp assembly 154 that is detachably coupled to the working end 144 of the swing arm 110a. The clamp assembly 154 of FIGS. 3 and 4 includes a clamp member 174, and a tip base 176. A pair of cutting elements 152a, 152b is sandwiched between the clamp member 174 and the tip base 176. The illustrated clamp member 174 of FIGS. 4 and 13-18 includes a mounting region 192 and a retaining region 194. As shown in FIGS. 5 and 6, the mounting region 192 is configured to engage the working end 144 of the swing arm assembly 110a to reduce, limit, or substantially prevent unwanted movement between the clamp member 174 and the swing arm assembly 110a.

The debarker tip assembly 122a of FIG. 3 is detachably mounted to the working end 144 of the swing arm assembly 110a. The illustrated fasteners 172a, 172b (see FIG. 4) can couple the debarker tip assembly 122a to the working end 144. A user can operate the fasteners 172a, 172b to move the clamp assembly 154 between a closed configuration (FIG. 3) and an open configuration (FIG. 4). When in the open configuration, one or both of the cutting elements 152a, 152b can be replaced, if needed or desired.

The fasteners 172a, 172b can also be removed to disassemble the clamp assembly 154 to, for example, perform maintenance or replace its components. For example, the fasteners 172a, 172b can be removed to replace the entire clamp assembly 154.

The term "fastener" is a broad term and generally refers, without limitation, to one or more devices or structures that are capable of coupling a debarker tip assembly to a swing arm assembly during normal use. A fastener can include, but is not limited to, one or more nut/bolt assemblies, pin/rod assemblies, threaded members, nuts, combinations thereof, and the like. As used herein, the term "bolt" is to be construed broadly and may include, without limitation, an externally threaded fastener that can be inserted through a hole (e.g., circular holes, elliptical holes, and the like) and configured to receive a threaded nut. A bolt, in some embodiments, may have a head (e.g., a hexagonal head, square head, slotted head, etc.) that engages the surface of the working end 144 of the swing arm assembly 110a. The illustrated fasteners 172a, 172b are externally threaded bolts used to conveniently and quickly decouple the clamp assembly 154 from the working end 144. The debarker tip assembly 122a can also have various types of fasteners in the form of nut and bolt assemblies.

Referring to FIGS. 4-6, the fasteners 172a, 172b are configured to prevent the cutting elements 152a, 152b from being pulled out of a receiving channel 162 when the fasteners 172a, 172b are installed in corresponding holes 163 in the swing arm 110a and holes 164a, 164b in the clamp member 174. Each of the fasteners 172a, 172b can have external threads that threadably mate with internal threads along one of the holes 164a, 164b. The illustrated fasteners 172a, 172b are dimensioned to extend through the working end 144, the tip base 176, and at least a portion of the clamp member 174. To adjust the clamp-up forces in the debarker tip assembly 122a, one or both of the fasteners 172a, 172b can be operated (e.g., twisted). Because the fasteners 172a, 172b are tensioned (as discussed below), the fasteners 172a, 172b remain securely in place, even when the clamp assembly 154 is subjected to significant cyclic loading. The illustrated debarker tip assembly 122a includes two fasteners 172a, 172b, although any number of fasteners can be used.

Referring to FIGS. 5 and 6, the tip base 176 can be disposed between the clamp member 174 and the swing arm 110a. The receiving channel 162 is formed between the clamp member 174 and the tip base 176. The clamp member 174 and the tip base 176 can key together to ensure proper alignment of the clamp assembly 154 throughout the manufacturing process. The type of keying arrangements utilized can be selected on the expected load forces generated during the debarking process. For example, the mounting region 192 of the clamp member 174 includes a protruding keying feature 202 (see also FIGS. 13-15,17 and 18), and the tip base 176 includes an opening 204 (see also FIGS. 19, 22, and 23) for receiving the keying feature 202. When assembled, the keying feature 202 extends through the opening 204 and into a recess 210 (FIG. 6) in the swing arm assembly 110*a*. In this manner, the components of the clamp assembly 154 are locked together.

To permit at least some relative movement between components of the clamp assembly 154, the tip base 176 can have a heel 212, which contacts a region of the clamp member 174 opposing the receiving channel 162. The retaining region 194 of the clamp member 174 may rotate away from an initial position (as indicated by the arrow 197 of FIG. 6) when the fasteners 172*a*, 172*b* are loosened. A desired clamp-up force can be achieved by conveniently rotating the fasteners 172*a*, 172*b*. The illustrated heel 212 of FIGS. 20, 21, 21A, and 23 is an elongated strip projecting outwardly and extending along one side of the tip base 176 opposite a retaining region 207 of the tip base 176. The height, width, and shape of the heel 212 can be selected based on the desired range of tolerances of the cutting elements 152*a*, 152*b* or other criteria that may affect performance and the working life of the debarker tip assembly 154. The heel 212 permits larger tolerances of one or more components of the clamp assembly 154 or at least one of the cutting elements 152*a*, 152*b*, or both. For example, the heel 212 with a height of 0.010 inches is suitable for use with cutting elements 152*a*, 152*b* having a thickness tolerance of ±0.005 inches. High clamp-up forces can be achieved without unwanted damage (e.g., fracture) of the cutting elements 152*a*, 152*b*. The clamp-up forces are properly distributed to the cutting elements 152*a*, 152*b* to keep stresses at or below a selected level. The heel 212 provides enough forgiveness such that ground cutting elements with tight tolerances or non-ground cutting elements can be used. Additionally, the heel 212 may provide tensioning of the fasteners 172*a*, 172*b* and, thus, may reduce the likelihood of unwanted loosening of the fasteners 172*a*, 172*b*.

As noted above, each of the cutting elements 152*a*, 152*b* is dimensioned so as to fit within the receiving channel 162. The cutting elements 152*a*, 152*b* can be generally similar to each other and, accordingly, the following description of one of the cutting elements applies equally to the other, unless indicated otherwise.

Figure 25:
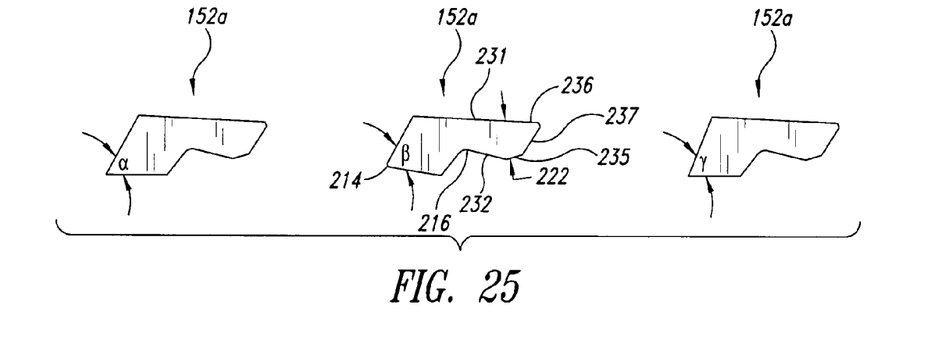
FIG. 25 is a front view of the cutting element of FIG. 24, shown with three different tool angles.
Figure 26:
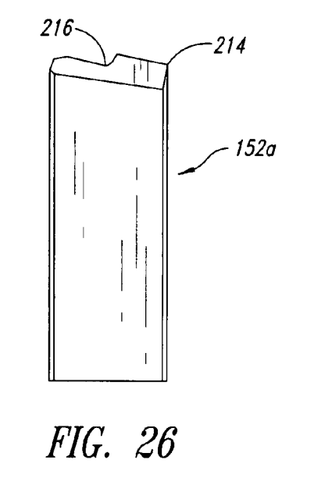
FIG. 26 is a top view of the cutting element of FIG. 24.
Figure 27:
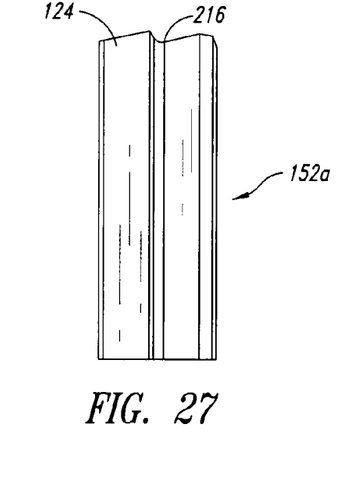
FIG. 27 is a bottom view of the cutting element of FIG. 24.
Figure 28:
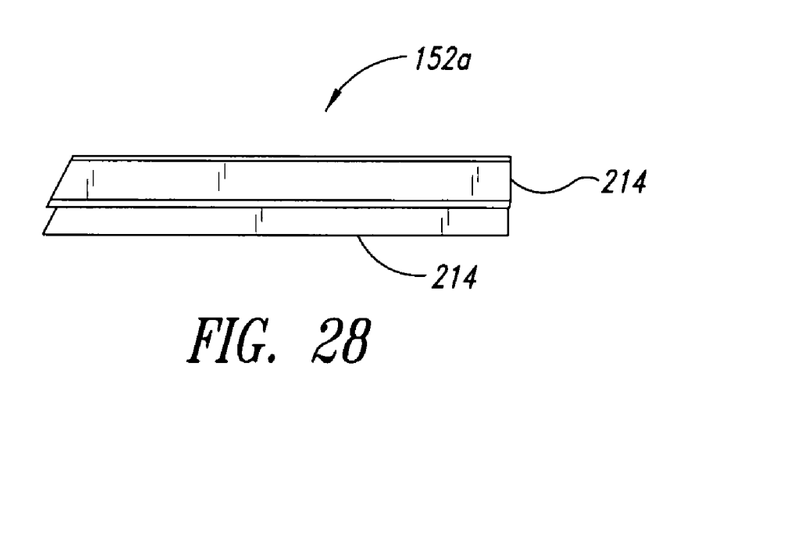
FIG. 28 is a side elevational view of the cutting element of FIG. 24.
Figure 29:
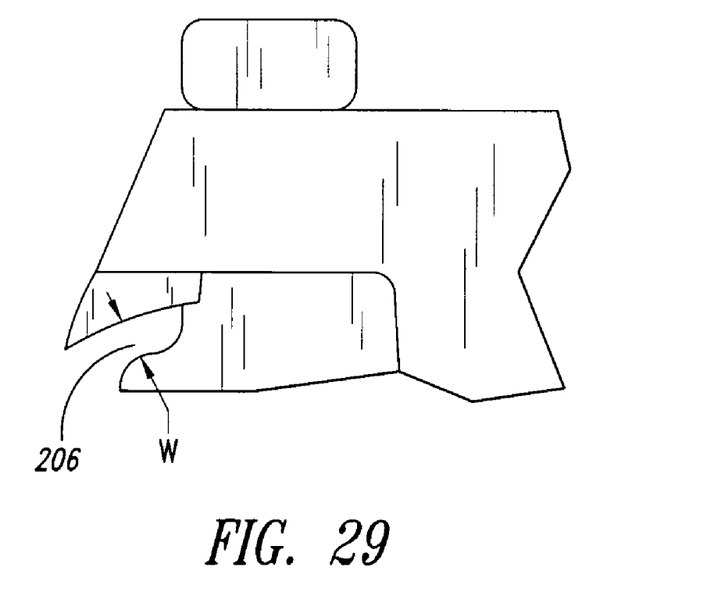
FIG. 29 is a side elevational view of a debarker tip assembly without a cutting element, according to one illustrated embodiment.

The cutting element 152*a* of FIGS. 24-28 includes a leading edge 214 configured to contact a log and a narrowed region 216 opposing the leading edge 214. The leading edge 214 can be slightly rounded, a sharp corner, or any other configuration suitable for processing a log. The leading edge 214, for example, can be designed to cut, scrape, abrade, roughen, or otherwise process a log. The configuration of the leading edge can be selected based on the desired cutting action. FIG. 25 shows three different cutting elements, each having a different leading edge configuration. The illustrated leading edges have different angles of leading edges χ, β, γ. Because the cutting elements are interchangeable, a user can be installed a cutting element for a desired cutting action. A kit can include a plurality of cutting elements, each having a different tip configuration. A user can install a cutting element that terminates in a tip for desired cutting action. The cutting element can be replaced with a different cutting element in which the tip of the cutting element terminates in an angle different from the angle at the tip of the cutting element.

The narrowed region 216 may be dimensioned to fit in the receiving channel 162 such that the cutting element 152*a* is fixedly retained by the closed clamp assembly 154. The narrowed region 216 and the receiving channel 162 can have complementary shapes to form an interference fit.

The narrowed region 216 illustrated in FIG. 25 has a pair of opposing surfaces 231, 232 configured to mate with the channel 162. The surfaces 231, 232 can taper inwardly towards one another in the direction of the leading edge 214. The illustrated channel 162 of FIG. 29 defines an opening 206 having a width W that is less the width of a maximum width portion 222 of the narrowed region 216.

In some embodiments, the narrowed region 216 includes a plurality of contact surfaces 232, 235, 237 that are not parallel to one another. The plurality of contact surfaces 232, 235, 237 are positioned and oriented to ensure stresses in the cutting element 152*a* are kept at or below a selected level, even if the cutting element 152*a* has non-ground, relatively rough surfaces.

The cutting elements 152*a*, 152*b* can be made of a material suitable for contacting logs. Hardened materials are especially well suited for repeatedly processing logs for extended periods of time. In some embodiments, the leading edge 214 is formed of a hardened material, which may include, without limitation, carbide (e.g., tungsten carbide, titanium carbide, or the like) and other high wear materials that can withstand significant forces. Various types of testing methods (e.g., the Rockwell hardness test or Brinell hardness test) can be used to determine the hardness of a material. In some non-limiting exemplary embodiments, the cutting element 152*a* is made, in whole or in part, of a material having a hardness that is about 2 $R_c$ (Rockwell, Scale C), 5 $R_c$, 10 $R_c$, or 15 $R_c$ greater than the hardness of steel used in conventional debarking tips. In some embodiments, the leading edge 214 (or other portion (s) of the cutting element 152*a*) is formed, in whole or in part, of a material having a hardness greater than about 62 $R_c$. At least a majority of the cutting element 152*a* may be formed of the hardened material. In other embodiments, the cutting element 152*a* can be made of non-hardened material, such as aluminum, steel, composite materials, plastics, and the like.

As noted above, the clamp assembly 154 can minimize, limit, or substantially eliminate unwanted excess movement of the cutting elements 152*a*, 152*b*. The fasteners 172*a*, 172*b*, in some embodiments, can be set to prevent or reduce the likelihood of cutting element pullout. The clamping forces generated by the clamp assembly 154 can be sufficiently high to prevent pullout but sufficiently low to prevent damage to the cutting element 152*a*, such as cracking or permanent deformation.

To reduce or limit localized stresses, the loading across the cutting element 152*a* can vary to keep stresses at or below an acceptable level. In the illustrated embodiment of FIG. 6, the tension in the fasteners 172*a*, 172*b* can be adjusted to obtain desired compressive forces applied to the surfaces 232, 236 of the cutting element 152*a*. When the cutting element 152*a* engages a log, reactive forces provided by a surface 241 of the channel 162 act on the surface 237 of the cutting element 152*a*.

Various types of methods can be used to install the side-by-side cutting elements 152*a*, 152*b*. In some methods of installation, the cutting elements 152*a*, 152*b* are positioned in the channel 162 of the clamp assembly 154 when the clamp assembly 154 is in a partially open position. The clamp assembly 154 is then moved to the closed position to hold the cutting elements 152*a*, 152*b*. The closed clamp assembly 154 can allow the cutting elements 152*a*, 152*b* to redistribute the loads, and associated stresses, in response to different applied loads. In this manner, stresses in the debarker tip assembly 154 can be kept at or below a selected level to minimize or substantially eliminate damage (e.g., facture, permanent deformation, fatigue damage, strain hardening, or the like) of the cutting elements 152a, 152b.

The components disclosed herein can be installed in a debarker apparatus by the original equipment manufacture ("OEM"). For example, clamp assemblies, cutting elements, and the like can be installed by an OEM. Alternatively, the components can be installed after market. A skilled artisan can design the debarker tip assemblies for mounting onto various known debarkers, such as, for example, the debarkers disclosed in U.S. Pat. Nos. 3,190,327; 4,566,371; and 4,844,201, which are hereby incorporated by reference in their entireties. For example, the clamp assemblies can be mounted on traditional swing arms, which have been modified for the aftermarket modification. The debarker tip assemblies or its components can be used with swing arm assemblies, carriages (e.g., rotatable rings), actuating systems, techniques and methods described in U.S. Pat. Nos. 3,190,327; 4,566,371; and 4,844,201.

Various methods and techniques described above provide a number of ways to practice the invention. Of course, it is to be understood that not necessarily all objectives or advantages described may be achieved in accordance with any particular embodiment described herein.

Furthermore, the skilled artisan will recognize the interchangeability of various features from different embodiments disclosed herein. Similarly, the various features and acts discussed above, as well as other known equivalents for each such feature or act, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A debarker tip assembly for a debarker apparatus, comprising:
    a clamp assembly configured to be detachably coupled to a swing arm of the debarker apparatus, the clamp assembly manipulateable between an open configuration and a closed configuration, the clamp assembly comprising:
        a clamp member comprising a mounting region and a retaining region, the mounting region configured to mate with a complementary portion of the swing arm;
        a tip base dimensioned for placement between the clamp member and the swing arm such that a receiving channel is defined between the clamp member and the tip base when the clamp assembly is in the closed configuration; and
    a cutting element dimensioned so as to fit within the receiving channel of the clamp assembly, the cutting element comprising:
        a leading edge configured to remove bark from a log; and
        a narrowed region dimensioned to nest in the receiving channel of the clamp assembly such that the cutting element is fixedly retained by the clamp assembly and the leading edge is exposed to engage the log.

2. The debarker tip assembly of claim 1, further comprising:
    at least one fastener that prevents under standing operating conditions the cutting element from being pulled out of the receiving channel when the at least one fastener is installed in a hole in the swing arm and the clamp assembly is in the closed configuration.

3. The debarker tip assembly of claim 2, wherein the at least one fastener is dimensioned to extend through the tip base and at least a portion of the clamp member such that the at least one fastener adjusts clamp-up forces when the at least one fastener is operated.

4. The debarker tip assembly of claim 1, wherein the mounting region of the clamp member comprises a keying feature and the tip base comprises an opening, the keying feature is configured to extend through the opening of the tip base and into a recess in the swing arm.

5. The debarker tip assembly of claim 1, wherein the receiving channel and the narrowed region of the cutting element have complementary shapes such that an interference fit is formed between the receiving channel and the narrowed region when the clamp assembly is in the closed configuration.

6. The debarker tip assembly of claim 1, wherein the tip base further comprises:
    a heel that contacts a region of the clamp member that opposes the receiving channel such that a gap is formed between the clamp member and the tip base.

7. The debarker tip assembly of claim 1, wherein the receiving channel defines an opening having a width that is less than a maximum width of the narrowed region.

8. The debarker tip assembly of claim 1, wherein at least a portion of the cutting element comprises a hardened material.

9. The debarker tip assembly of claim 8, wherein the hardened material is carbide.

10. The debarker tip assembly of claim 1, further comprising:
    at least one additional cutting element configured for placement in the receiving channel next to the other cutting element.

* * * * *